United States Patent
Adderly et al.

(10) Patent No.: US 7,818,337 B2
(45) Date of Patent: Oct. 19, 2010

(54) SYSTEM AND METHOD FOR DYNAMICALLY EXPOSING SQL STATEMENTS AS WEB PROTOCOLS

(75) Inventors: Darryl Maurice Adderly, Morrisville, NC (US); Roland Barcia, Leonia, NJ (US); Steven Dale Ims, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 11/966,901

(22) Filed: Dec. 28, 2007

(65) Prior Publication Data

US 2009/0171922 A1 Jul. 2, 2009

(51) Int. Cl.
*G06F 17/30* (2006.01)

(52) U.S. Cl. .................... 707/769; 709/227
(58) Field of Classification Search ............ 707/609, 707/705, 769, 802; 709/227
See application file for complete search history.

(56) References Cited

U.S. PATENT DOCUMENTS

2008/0147614 A1* 6/2008 Tam et al. ............ 707/3

\* cited by examiner

*Primary Examiner*—Fred I Ehichioya
(74) *Attorney, Agent, or Firm*—VanLeeuwen & VanLeeuwen (57) ABSTRACT

A system, method, and program product is provided that receives a client request from a client computer system over a computer network, such as the Internet. The client request includes a request method and also includes a resource identifier. The system traverses a directory structure using the resource identifier. A resource file is located based on the traversing. The name associated with the resource file also includes the name of the resource method. A database query statement is retrieved from the located resource file. The retrieved database query statement is executed. The execution of the database query statement yields one or more database results, such as records from a database table. These database results are returned to the client computer system.

20 Claims, 7 Drawing Sheets

SYSTEM AND METHOD FOR DYNAMICALLY EXPOSING SQL STATEMENTS AS WEB PROTOCOLS

BACKGROUND OF THE INVENTION

1. Technical Field

The present invention relates to a system and method that dynamically exposes Structured Query Language (SQL) statements as web protocols. More particularly, the present invention relates to a system and method that exposes data by executing SQL queries that are stored in files and directories using a naming convention that reduces programming within the individual files.

2. Description of the Related Art

Web 2.0 applications introduce the notion of mash-ups. Mash-up is a way of quickly pulling together data from various sources to create totally new applications. In order for data to become "mashupable," a developer needs to expose data via Web 2.0 protocols. Often times, this means creating applications for the sole purpose of exposing the data.

Using current technology, exposing data via Web 2.0 protocols involves writing a full fledged application to translate result sets into a user interface (UI) format. Existing web technologies contain many layers for executing business logic and middleware function, that involves moving data from result sets, into intermediate middleware object, such as ordinary Java objects (also known as "Plain Old Java Objects" or "POJO's"), or Enterprise Java Beans (EJB's), and then translating them to a client side technology.

The obvious challenge of using current technology is the need to write full-fledged applications in order to expose data from the middleware to the Web 2.0 applications. The present invention addresses this challenge.

SUMMARY

It has been discovered that the aforementioned challenges are resolved using a system, method and computer program product that receives a client request from a client computer system over a computer network, such as the Internet. The client request includes a request method and also includes a resource identifier.

The system traverses a directory structure using the resource identifier. A resource file is located based on the traversing. The name associated with the resource file also includes the name of the resource method. A database query statement (e.g., an SQL statement) is retrieved from the located resource file.

The retrieved database query statement is executed. The execution of the database query statement yields one or more database results, such as records from a database table. These database results are returned to the client computer system over the computer network.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
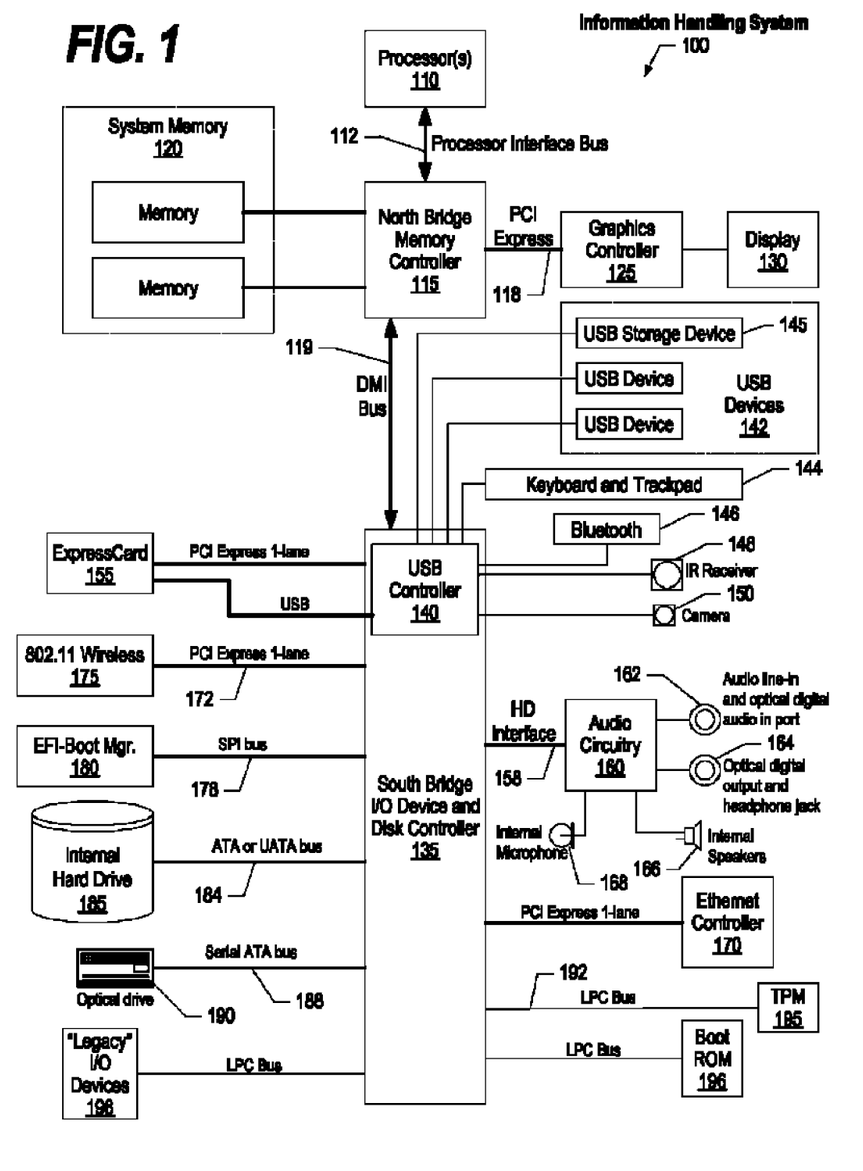
FIG. 1 is a block diagram of a data processing system in which the methods described herein can be implemented.
Figure 2:
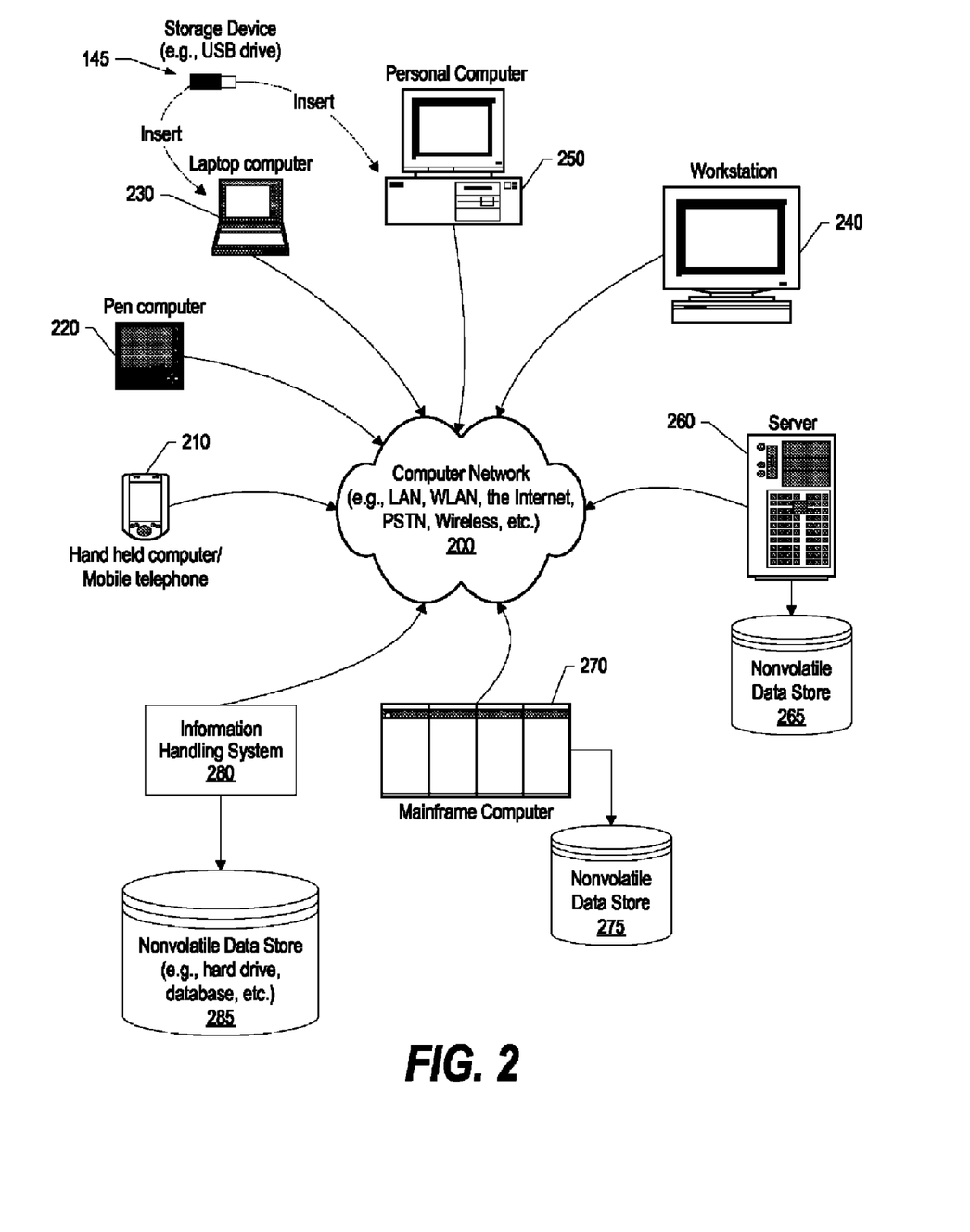
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which is coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 185, such as a hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, Bluetooth device 146 which provides for wireless personal area networks (PANs), keyboard and trackpad 144, and other miscellaneous USB connected devices 142, such as a mouse, portable storage devices, modems, network cards, ISDN connectors, fax, printers, USB hubs, and many other types of USB connected devices.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, while not shown, an individual nonvolatile data store can be shared amongst two or more information handling systems using various techniques.

Figure 3:
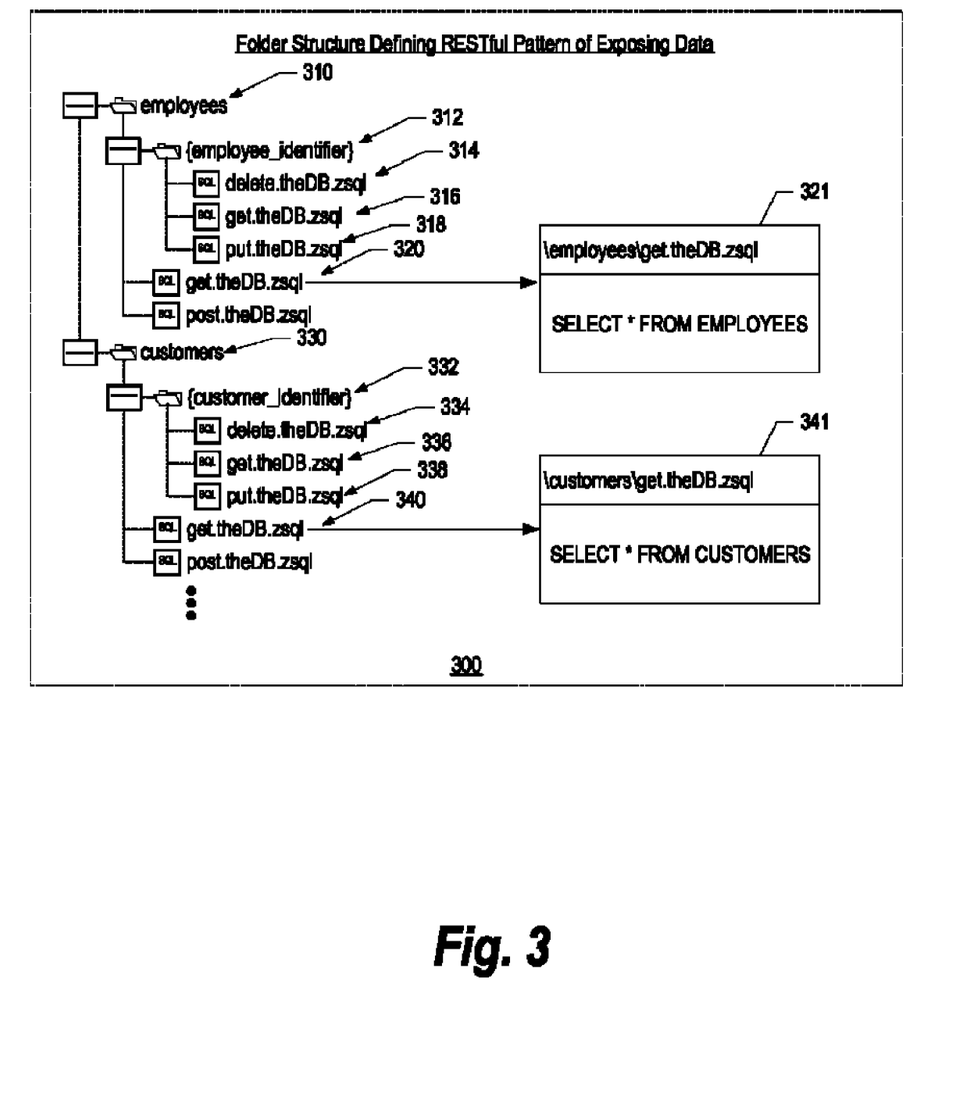
FIG. 3 is a diagram showing a folder structure and file naming conventions used to expose data without requiring full fledged software applications.

FIG. 3 is a diagram showing a folder structure and file naming conventions used to expose data without requiring full fledged software applications. A RESTful web application requires a different design approach from an RPC (remote procedure call) application. An RPC application is exposed as one or more network objects, each with an often unique set of functions that can be invoked. Before a client communicates with the application it obtains knowledge of the object identity in order to locate it and also has knowledge of the object type in order to communicate with it. RESTful design constrains the aspects of a resource that define its interface (the verbs and content types). This leads to the definition of fewer types on the network than an RPC-based application but more resource identifiers (nouns). REST design seeks to define a set of resources that clients can interact with uniformly, and to provide hyperlinks between resources that clients can navigate without requiring knowledge of the whole resource set. Server-provided forms can also be used in a RESTful environment to describe how clients should construct a URL in order to navigate to a particular resource.

FIG. 3 shows a RESTful structure (300) of files with "zsql" extensions. The nodes (files) in this RESTful directory structure include Structured Query Language (SQL) statements. In the example shown, a high-level identifier exists for both "employees" (employees directory entry 310) and "customers" (customers directory entry 330). If an incoming request includes a variable parameter (e.g., a particular employee or a particular customer), then the subdirectory that takes the parameter is taken (e.g., {employee_identifier} subdirectory 312 when a particular employee is being requested and {customer_identifier} subdirectory 332 when a particular customer is being requested).

The end nodes are files that include SQL statements corresponding to the particular request. Within the {employee_identifier} subdirectory three different nodes (files) are shown—"delete.theDB.zsql" (file 314) would include the SQL statements needed to delete the particular employee from the database. Likewise "get.theDB.zsql" (file 316) would include SQL statements to get (retrieve) the particular employee's record from the database and return the data to the caller (as will be explained in further detail). Similarly, "put.theDB.zsql" would include SQL statements used to add the particular employee to the database. Corresponding files also exist within the {customer_identifier} subdirectory. The file "delete.theDB.zsql" (file 334) includes the SQL statements needed to delete the particular customer from the database. Likewise "get.theDB.zsql" (file 336) would include SQL statements to get (retrieve) the particular customer's record from the database and return the data to the caller. Similarly, "put.theDB.zsql" would include SQL statements used to add the particular customer to the database.

End nodes also are provided for the higher-level directory elements. In particular, "get.theDB.zsql" (files 320 and 330) are provided for both the employees directory as well as the customers directory. These files include SQL statements to retrieve an entire table and are shown in files 321 and 341, respectively. File 321 shows that the "get.theDB.zsql" to retrieve employees executes an SQL statement included in the file that reads "SELECT * FROM EMPLOYEES". Likewise, file 341 shows that the "get.theDB.zsql" to retrieve customers executes an SQL statement included in the file that reads "SELECT * FROM CUSTOMERS". Those skilled in the art will recognize that these SELECT statements are retrieving entire tables from a relational database.

Having benefit of this disclosure, it will be readily apparent that modifications can be applied to these teachings to allow variables (parameters) to be transmitted in order to provide a variable to revise the selection set. For example, taking a parameter value of {employee_criteria}, the SELECT statement in file 321 could be modified to be "SELECT * FROM EMPLOYEES WHERE {employee_criteria}". The system would then replace the {employee_criteria} placeholder with search criteria provided by the client, such as "SELECT * FROM EMPLOYEES WHERE LASTNAME=SMITH" in order to retrieve all employees with a last name of "Smith."

Figure 4:
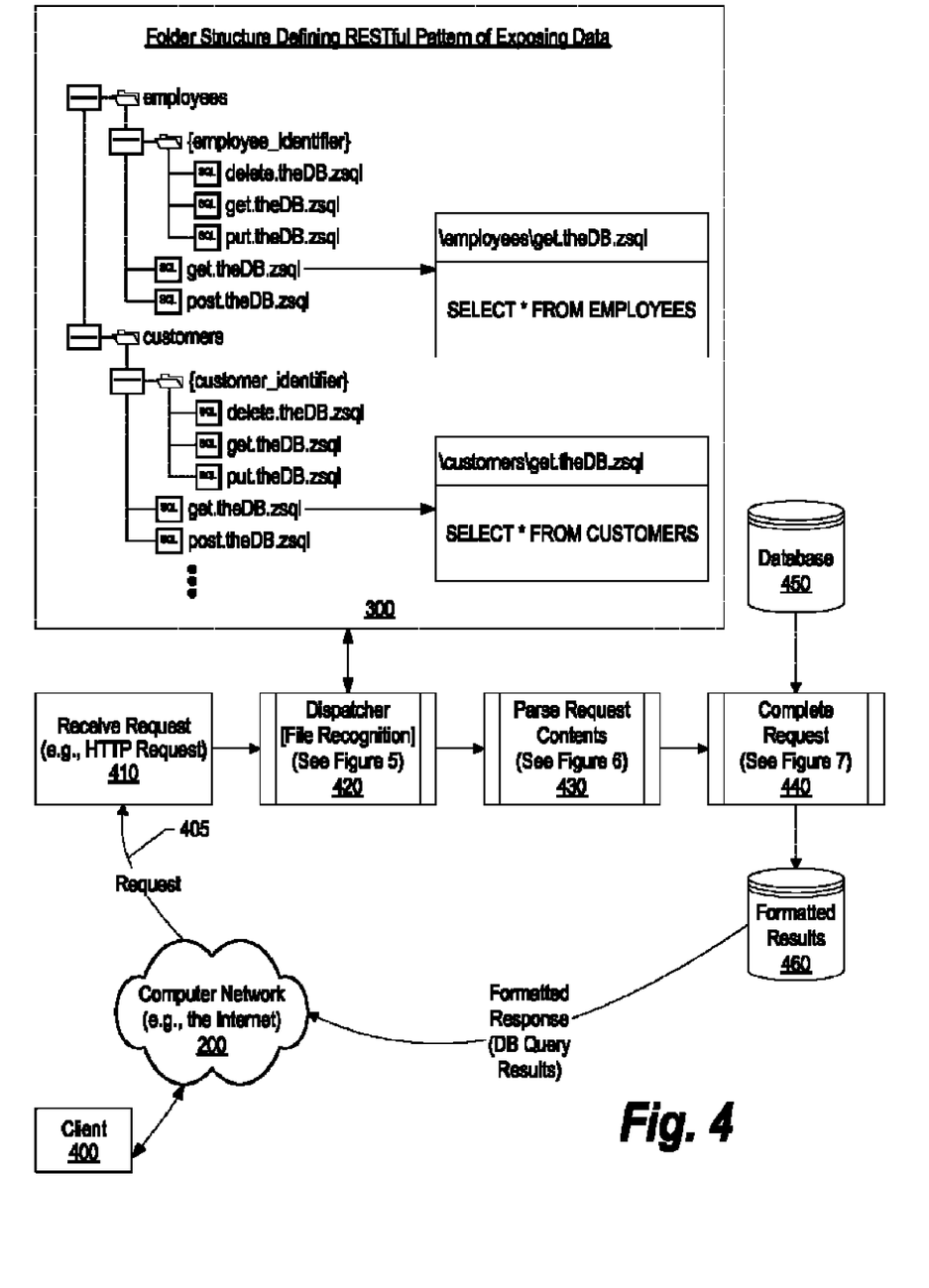
FIG. 4 is a high-level flowchart showing steps taken to process simple network commands and retrieve data using the file naming conventions introduced in FIG. 3.

FIG. 4 is a high-level flowchart showing steps taken to process simple network commands and retrieve data using the file naming conventions introduced in FIG. 3. Client 400 submits request 405 (e.g., a "GET" request using a well-known protocol such as the Hypertext Transfer Protocol (HTTP)). Request 405 is transmitted through computer network 200, such as the Internet, where, at step 410 it is received by the computer system (e.g., a server that is handling the requests).

Figure 5:
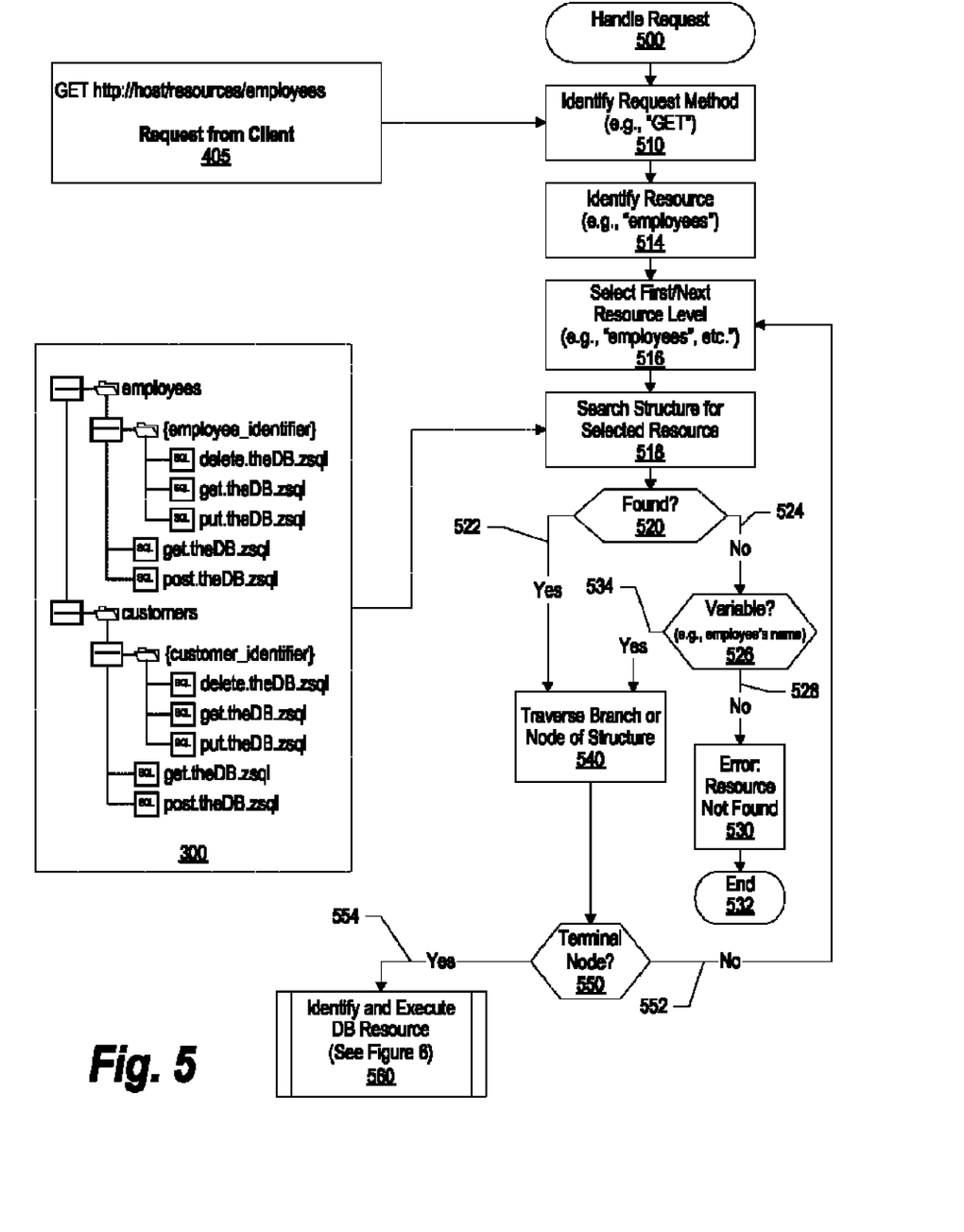
FIG. 5 is a flowchart showing steps taken by the system to handle the incoming request and find the file with the SQL statement that matches the request.

At predefined process 420, a dispatcher routine is executed in order to identify the resource (e.g., file) being requested by the client (see FIG. 5 and corresponding text for processing details). After the dispatcher routine has executed, at predefined process 430 the contents of the request are parsed (e.g., analyzed) in order to identify the SQL resource and execute the SQL statement included in the SQL resource (see FIG. 6 and corresponding text for processing details). When the data has been retrieved, predefined process 440 completes the request by retrieving data from the database (using the SQL statements from the identified SQL resource) and formatting the data into formatted results 460 (e.g., XML code, JSON, etc.). Formatted results are, as the name implies, in a format more suitable for use (e.g., display) at client 400. Formatted results 460 are then returned to client 400 via computer network 200.

FIG. 5 is a flowchart showing steps taken by the system to handle the incoming request and find the file with the SQL statement that matches the request. Processing commences at 500 whereupon, at step 510, the dispatcher identifies the request method included in client request 405. In the example, the request is a "GET" request and identifies the resource "http://host/resources/employees." At step 514, the particular resource that is being requested is identified. In this example, the resource is "employees." The resource may include multiple levels (e.g., "employees.name" where name is a name of an employee that is being requested in the GET request, etc.). At step 516, the first resource level is selected (e.g., "employees", etc.).

At step 518, RESTful structure 300 is searched for the selected resource. A determination is made as to whether the resource is found within the structure (decision 520). If the resource is found, decision 520 branches to "yes" branch 522 whereupon, at step 540, the identified branch, or node, of the RESTful structure is traversed. On the other hand, if the particular resource is not found it can either mean that the resource does not exist or that the resource level allows a variable parameter, such as an employee's name, that is passed to the resource (e.g., in order to perform a GET request for all employees with the last name of "Smith"). If the particular resource name is not found, then decision 520 branches to "no" branch 524 whereupon, a determination is made as to whether the resource level provides for use of a variable parameter (decision 526). In one embodiment, a file notation is provided using braces ({ }) that enclose a parameter name. For example, a RESTful structure that includes a level of "employees\{employee_identifier}" provides for a variable parameter following the "employees" level. In this example, a GET request for "/employees/Smith" would traverse to the {employee_identifier} level of the structure in order to retrieve a resource (e.g., get.theDB.zsql) that uses the parameterized variable (e.g., "Smith") in the resource in order to, for example, retrieve all employee records where the employee's name is "Smith." If a parameter is supported, then decision 526 branches to "yes" branch 534 whereupon, at step 540, the branch that accepts the parameterized variable is traversed (e.g., the {employee_identifier} level of the RESTful structure). On the other hand, if a variable parameter is not supported and the requested resource or level is not found in RESTful structure 300, then decision 526 branches to "no" branch 528 whereupon, at step 530, an error is returned indicating that the requested resource was not found and processing ends at 532.

Returning to step 540, if a fixed branch or terminal is found (e.g., "/employees") or if a variable branch is found (e.g., "{employee_identifier}"), then the branch is traversed. A determination is made as to whether processing has reached the terminal, or last, node (decision 550). The terminal node being a resource file (a .zsql file). If a terminal node has not yet been reached, then decision 550 branches to "no" branch 552 which loops back to traverse further levels of the RESTful structure according to the client request. This looping continues until a terminal node of the RESTful structure is reached, at which point decision 550 branches to "yes" branch 554 whereupon predefined process 560 is executed to identify and execute the database resource (see FIG. 6 and corresponding text for processing details).

Figure 6:
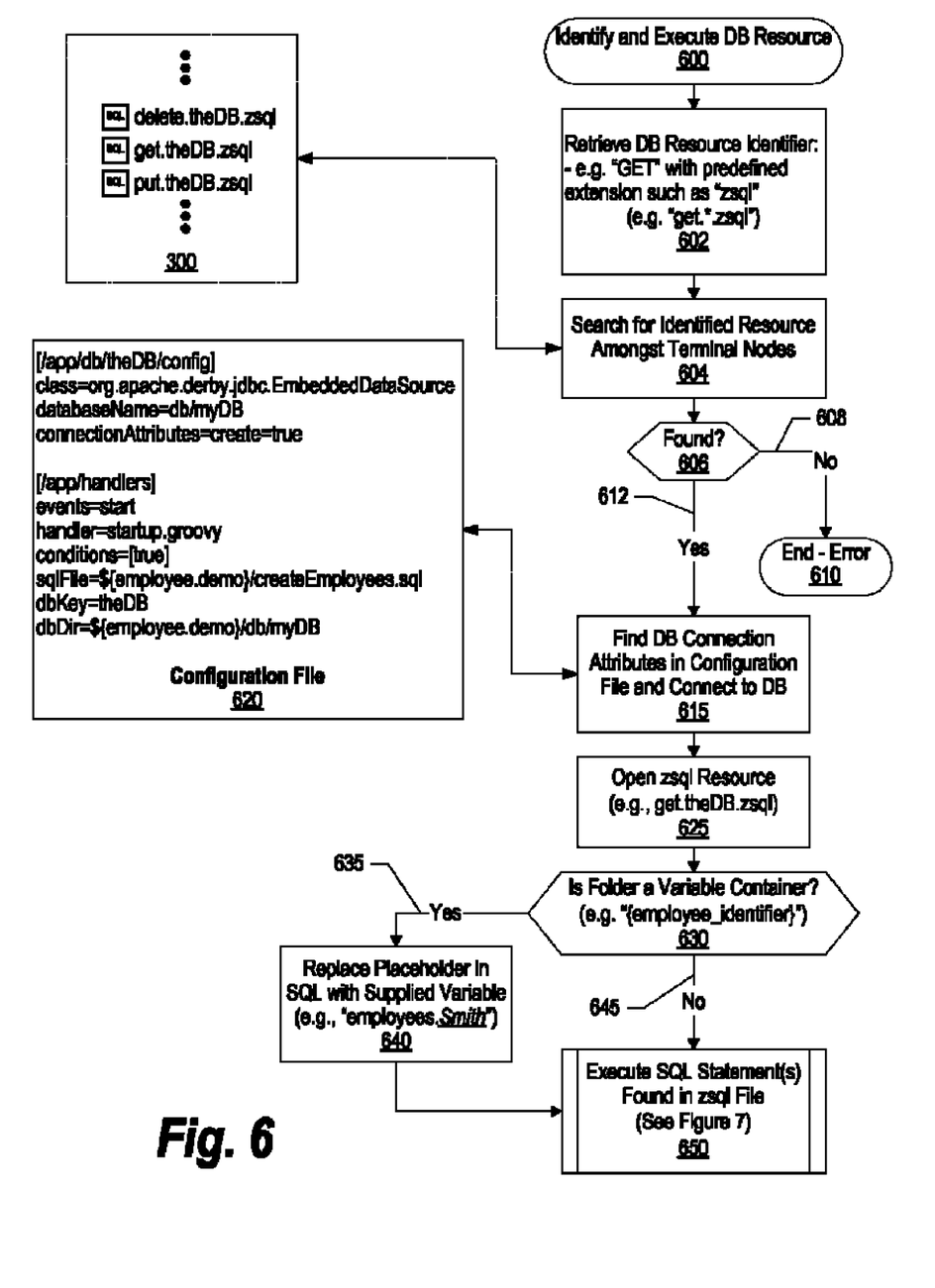
FIG. 6 is a flowchart showing steps taken to identify and execute statements in an identified database resource file.

FIG. 6 is a flowchart showing steps taken to identify and execute statements in an identified database resource file. Processing commences at 600 whereupon, at step 602 the database resource identifier retrieved using the request method (e.g., "GET"). At step 604, a search for the resource is made amongst the terminal nodes in RESTful structure 300. Using the "GET" example from above, the resource that matches the request would be "get.theDB.zsql" with "theDB" identifying the database connection.

A determination is made as to whether the requested resource is found in the RESTful structure (decision 606). If the resource is not found, then decision 606 branches to "no" branch 608 whereupon processing ends with an error being returned at 610 indicating that the requested resource was not found. On the other hand, if the resource was found, then decision 606 branches to "yes" branch 612 whereupon, at step 615 the database connection identified in the resource (e.g., "theDB") is retrieved from configuration file 620. The retrieved database connection attributes are used to connect to the database upon which the SQL query will be performed. In this manner, a RESTful structure can support connections to multiple databases and multiple types of database connections based upon the database connection attributes included in configuration file 620.

At step 625, the database resource file is opened (e.g., the "get.theDB.zsql" file). A determination is made as to whether parameterized data, such as an employee's name, was included in the client's request (decision 630). If such parameterized data was included in the request, then decision 630 branches to "yes" branch 635 whereupon, at step 640, the placeholder in the resource file is replaced with the data supplied in the client request. For example, if the SQL statement in the file is "SELECT * FROM EMPLOYEES WHERE LASTNAME={employee_identifier}" and the client had sent a request of "GET http://host/resources/employees/Smith" then the placeholder in the SELECT clause would be replaced with the parameter provided in the client request, resulting in "SELECT * FROM EMPLOYEES WHERE LASTNAME=Smith" being the resulting SQL statement. This resulting SQL statement is then processed by predefined process 650 (see FIG. 7 and corresponding text for processing details). If a parameterized variable is not provided in the client request, then decision 630 branches to "no" branch 645 bypassing step 640 and, at predefined process 650, the SQL statement in the resource file (the .zsql file) is executed and the resulting data is returned to the client (see FIG. 7 and corresponding text for processing details).

Figure 7:
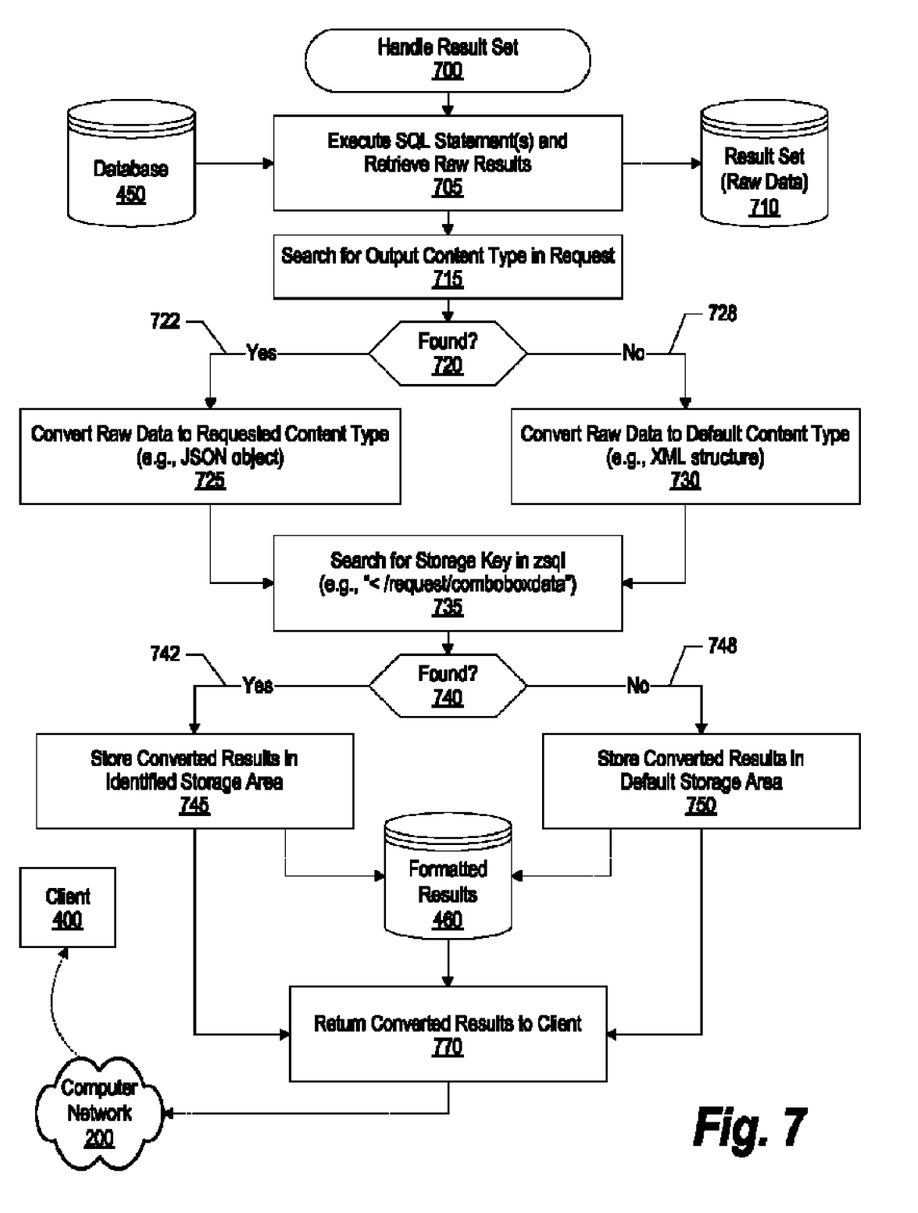
FIG. 7 is a flowchart showing steps taken to handle the data result set created from execution of the SQL statement.

FIG. 7 is a flowchart showing steps taken to handle the data result set created from execution of the SQL statement. Processing commences at 700 whereupon, at step 705, the SQL statement retrieved from the identified resource file is executed against database 405 resulting in result set 710. At this point, result set 710 is in a raw format output from the SQL statement and is often not in a format suitable for a user interface or at a client interface. At step 715 a search is made of the client request for an output content type request. A determination is made as to whether the client has requested a particular type of output content type (decision 720).

If the client has requested a particular output content type, then decision 720 branches to "yes" branch 722 whereupon, at step 725, raw data 710 is converted to the output content type specified in the client request. On the other hand, if the client request did not specify a particular output content type, then decision 720 branches to "no" branch 728 whereupon, at step 730, raw data 710 is converted to a default content type, such as XML.

At step 735, a search is made as to whether a storage key was specified in the resource file (e.g. in the .zsql file). The storage key is in a format that identifies a location where the resulting data should be stored so that the data can be readily retrieved without having to re-execute the SQL statement. For example, if the SQL statement is used to populate a combo box, the storage key might be "</request/comboboxdata". A determination is made as to whether a storage key is identified in the resource file (decision 740). If the storage key is specified, then decision 740 branches to "yes" branch 742 whereupon, at step 745, the converted results are stored at the server in a location specified by the storage key. On the other hand, if the storage key is not specified in the resource file, then decision 740 branches to "no" branch 748 whereupon, at step 750 the converted results are stored in a default storage area.

At step 770, formatted results (e.g., in JSON format, in XML format, etc.) are returned to client 400 using computer network 200, such as the Internet. Processing of the client's database request is now complete.

One of the preferred implementations of the invention is a client application, namely, a set of instructions (program code) or other functional descriptive material in a code module that may, for example, be resident in a tangible computer readable, such as the random access memory of the computer, as a computer program product. Until required by the computer, the computer program product may be stored in another tangible computer readable medium, for example, in a hard disk drive, or in a removable memory such as an optical disk (for eventual use in a CD ROM) or floppy disk (for eventual use in a floppy disk drive). Thus, the present invention may be implemented as a computer program product stored in a computer readable medium for use in a computer. In addition, the set of instructions may be downloaded via the Internet or other computer network. Furthermore, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
receiving, over a computer network, a client request from a client computer system, wherein the client request includes a request method and includes a resource identifier;
traversing a directory structure using the resource identifier, the traversing resulting in one or more identified resource files;
selecting one of the one or more identified resource files, wherein the selected resource file includes a name of the resource method;
retrieving one or more database connection attributes associated with the selected resource file, the database connection attributes corresponding to a database;
retrieving a database query statement from the selected resource file;
executing the retrieved database query statement on the database, the executing yielding one or more database results; and
returning the database results to the client computer system over the computer network.

2. The method of claim 1 further comprising:
retrieving a database connection identifier from the selected resource file, the one or more database connection attributes retrieved from a configuration file that is based upon the database connection identifier; and
connecting to the database using the retrieved database connection attributes, wherein the execution of the retrieved database query statement is performed after the connecting.

3. The method of claim 2 wherein the database connection identifier is included in a filename associated with the selected resource file.

4. The method of claim 1 further comprising:
identifying a data parameter in the client request;
traversing to a variable branch in the directory structure in response to identifying the data parameter;
identifying a placeholder in the database query statement; and
replacing the placeholder with the data parameter prior to executing the database query statement.

5. The method of claim 1 further comprising:
retrieving one or more raw results resulting from the execution of the database query statement; and
converting the raw results to the database results, wherein the database results are in a format readable by an interface running on the client computer system.

6. The method of claim 5 further comprising:
identifying an output content type in the client request; and
selecting a converter from a group of converters based upon the identified output content type, wherein the converting is performed using the selected converter.

7. The method of claim 1 further comprising:
retrieving a storage key in the selected resource file; and
storing the database results in a storage location corresponding to the retrieved storage key.

8. An information handling system comprising:
one or more processors;
a memory accessible by at least one of the processors;
a nonvolatile storage area accessible by at least one of the processors that includes a directory structure, a plurality of resource files, and a database;
a network adapter that connects the information handling system to a computer network; and
a set of instructions stored in the memory and executed by at least one of the processors in order to perform actions of:
receiving, over a computer network, a client request from a client computer system, wherein the client request includes a request method and includes a resource identifier;
traversing a directory structure using the resource identifier, the traversing resulting in one or more identified resource files;
selecting one of the one or more identified resource files, wherein the selected resource file includes a name of the resource method;
retrieving one or more database connection attributes associated with the selected resource file, the database connection attributes corresponding to a database;
retrieving a database query statement from the selected resource file;
executing the retrieved database query statement on the database, the executing yielding one or more database results; and
returning the database results to the client computer system over the computer network.

9. The information handling system of claim 8 wherein the set of instructions, when executed, cause at least one of the processors to perform further actions comprising:
retrieving a database connection identifier from the selected resource file, the one or more database connection attributes retrieved from a configuration file that is based upon the database connection identifier; and
connecting to the database using the retrieved database connection attributes, wherein the execution of the retrieved database query statement is performed after the connecting.

10. The information handling system of claim 9 wherein the database connection identifier is included in a filename associated with the selected resource file.

11. The information handling system of claim 8 wherein the set of instructions, when executed, cause at least one of the processors to perform further actions comprising:
identifying a data parameter in the client request;
traversing to a variable branch in the directory structure in response to identifying the data parameter;
identifying a placeholder in the database query statement; and
replacing the placeholder with the data parameter prior to executing the database query statement.

12. The information handling system of claim 8 wherein the set of instructions, when executed, cause at least one of the processors to perform further actions comprising:
- retrieving one or more raw results resulting from the execution of the database query statement; and
- converting the raw results to the database results, wherein the database results are in a format readable by an interface running on the client computer system.

13. The information handling system of claim 8 wherein the set of instructions, when executed, cause at least one of the processors to perform further actions comprising:
- retrieving a storage key in the selected resource file; and
- storing the database results on the nonvolatile storage device in a storage location corresponding to the retrieved storage key.

14. A computer readable medium comprising a computer program product that, when executed by an information handling system, causes the information handling system to perform actions that include:
- receiving, over a computer network, a client request from a client computer system, wherein the client request includes a request method and includes a resource identifier;
- traversing a directory structure using the resource identifier, the traversing resulting in one or more identified resource files;
- selecting one of the one or more identified resource files, wherein the selected resource file includes a name of the resource method;
- retrieving one or more database connection attributes associated with the selected resource file, the database connection attributes corresponding to a database;
- retrieving a database query statement from the selected resource file;
- executing the retrieved database query statement on the database, the executing yielding one or more database results; and
- returning the database results to the client computer system over the computer network.

15. The computer readable medium of claim 14 further comprising the computer program product that causes the informational handling system to perform additional actions that include:
- retrieving a database connection identifier from the selected resource file, the one or more database connection attributes retrieved from a configuration file that is based upon the database connection identifier; and
- connecting to the database using the retrieved database connection attributes, wherein the execution of the retrieved database query statement is performed after the connecting.

16. The computer readable medium of claim 15 wherein the database connection identifier is included in a filename associated with the selected resource file.

17. The computer readable medium of claim 14 further comprising the computer program product that causes the informational handling system to perform additional actions that include:
- identifying a data parameter in the client request;
- traversing to a variable branch in the directory structure in response to identifying the data parameter;
- identifying a placeholder in the database query statement; and
- replacing the placeholder with the data parameter prior to executing the database query statement.

18. The computer readable medium of claim 14 further comprising the computer program product that causes the informational handling system to perform additional actions that include:
- retrieving one or more raw results resulting from the execution of the database query statement; and
- converting the raw results to the database results, wherein the database results are in a format readable by an interface running on the client computer system.

19. The computer readable medium of claim 18 further comprising the computer program product that causes the informational handling system to perform additional actions that include:
- identifying an output content type in the client request; and
- selecting a converter from a group of converters based upon the identified output content type, wherein the converting is performed using the selected converter.

20. The computer readable medium of claim 14 further comprising the computer program product that causes the informational handling system to perform additional actions that include:
- retrieving a storage key in the selected resource file; and
- storing the database results in a storage location corresponding to the retrieved storage key.

* * * * *